Aug. 9, 1966  W. R. MONROE ET AL  3,265,411

SYPHON SUPPORT

Filed March 23, 1964

INVENTORS
WILLIAM R. MONROE
RALPH W. GOTSCHALL

BY *Beaman + Beaman*
ATTORNEYS

United States Patent Office 3,265,411
Patented August 9, 1966

3,265,411
SYPHON SUPPORT
William R. Monroe and Ralph W. Gotschall, Three Rivers, Mich., assignors to The Johnson Corporation, Three Rivers, Mich., a corporation of Michigan
Filed Mar. 23, 1964, Ser. No. 353,825
3 Claims. (Cl. 285—135)

The invention pertains to a syphon support, and particularly relates to a syphon support for rotating heat exchanger drums such as used for drying paper, fabric, and the like.

Rotating drying and heating drums, wherein steam or liquids are employed as the heat transfer medium, usually employ syphon devices for removing the condensate or cooled liquid from the drum. Such syphon systems normally include a pipe portion transversely disposed to the axis of the drum having a pick-up fitting disposed adjacent the inner surface of the drum. The syphon system also includes a horizontally disposed pipe portion extending through a hollow journal defined on the drum whereby the end of the syphon pipe extends exteriorly of the drum and communicates with a drain or exhaust system. Commonly, a rotary joint is also associated with the drum hollow journal whereby the heat-exchanging medium may be conveyed to the drum interior.

Syphon devices are usually of the "stationary" type or the "rotary" type. In a stationary syphon system, the syphon is stationarily supported with respect to the drainage system and, thus, the drum will be rotating with respect to the syphon pipe. In a rotating syphon system, the syphon pipes rotate with the drum and with respect to the drainage system. Stationary syphon pipes are usually employed with drums rotating at lower speeds, while the rotating syphon pipe arrangements are often used with drums rotating at higher velocities.

With both types of syphon systems, considerable difficulty has been experienced in supporting the horizontal syphon pipe with respect to the joint and drainage system. If the syphon pipe is threaded into the drainage system or supporting structure, as in the normal construction, the syphon pipe often fractures adjacent the thread with the result that the drum becomes inoperative.

It is an object of the invention to provide supporting means for a syphon pipe wherein the syphon pipe is firmly supported relative to the associated rotary joint, or drum, in such a manner that the support means do not weaken the syphon pipe structure and prevent excessive strains from being imposed on the threaded joints of the syphon pipe.

Another object of the invention is to provide a syphon pipe supporting device which will accurately center and support a syphon pipe with respect to its supporting structure and which may be easily disassembled and removed to permit removal of the syphon pipe from its associated rotary joint.

It is another object of the invention to provide a syphon pipe support which may be employed with either a stationary or rotating syphon pipe construction which effectively supports the syphon pipe in both types of installations.

These and other objects of the invention arising from the details and relationships of components of an embodiment thereof will be apparent from the following description and accompanying drawings wherein.

Figure 1:
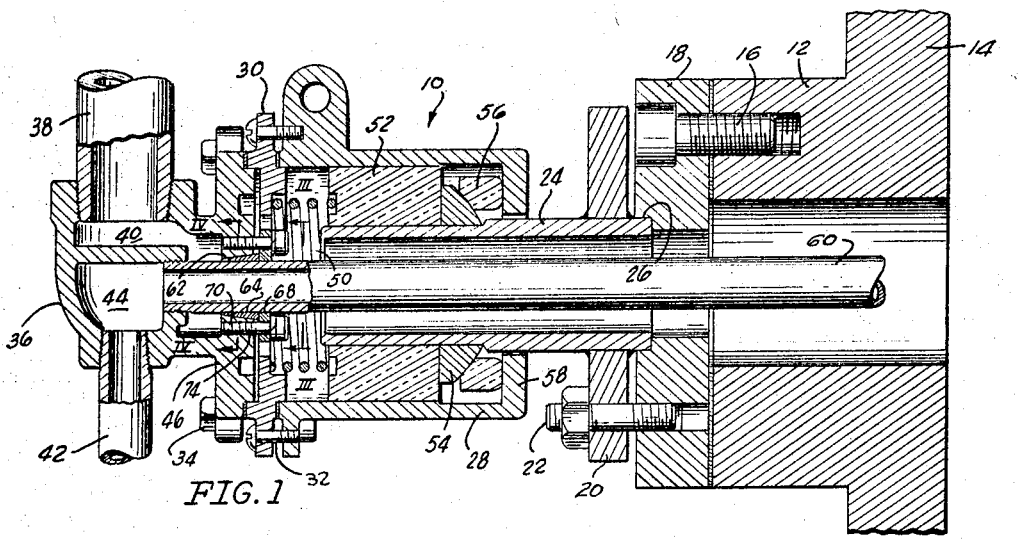
FIG. 1 is an elevational, diametrical, sectional view of a rotary joint and stationary syphon structure incorporating the invention as associated with a rotating drum journal.

FIG. 1 illustrates the concepts of the invention employed in the environment of a rotary joint employing a stationary syphon system. Rotary joint structure of the type which may utilize the invention is generally indicated at 10. The rotary joint 10 is mounted on a hollow journal 12 of a rotary drum head 14 by a plurality of bolts 16, one of which is shown, attaching an adapter plate 18 to the end of the hollow journal. A release ring 20 is attached to the adapter plate 18 by means of bolts 22 and the release ring is mounted on a sleeve 24 for maintaining the adjacent end of the sleeve in the recess 26 defined in the adapter. Thus, the sleeve 24 will be concentrically mounted on the hollow drum journal 12.

Figure 3:
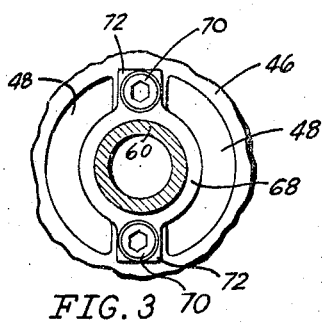
FIG. 3 is an elevational, enlarged, detail, sectional view of the syphon pipe support taken along section III—III of FIG. 1.
Figure 4:
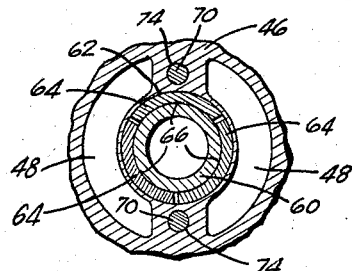
FIG. 4 is an elevational, sectional view taken through the syphon pipe support means along section IV—IV of FIG. 1.

The attachment of the joint housing 28 to the heat-exchanging medium supply system and the drainage system includes a head plate 30 affixed to the housing by screws 32. Bolts 34 attach housing 28 and plate 30 to the fitting 36 into which heat exchange medium conduit 38 threads for communication with the interior of the fitting through passage 40. The drainage conduit 42 threads into the lower portion of the fitting 36 and is in communication with the chamber 44. The fitting portion 46 constitutes a spider having openings 48, FIGS. 3 and 4, defined therein, whereby the heat exchange medium within the passage 40, usually steam, may flow into the housing 28 and into the sleeve 24 to the interior of the drum. A compression spring 50 interposed between the plate 30 and the annular sealing ring 52 biases the sealing ring into engagement with an annular seal 54 which in turn engages the annular seal 56 which engages the radial portion 58 of the housing 28. Thus, the spring 50 and the engaging seals prevent the heat exchange medium from escaping from the housing 28 while permitting the sleeve 24 to rotate relative to the housing.

The horizontal portion 60 of the syphon pipe assembly extends concentrically through the hollow journal 12 and sleeve 24, and is threaded at its outer end to screw into fitting 36 for communication with the drainage system chamber 44. To provide additional support of the stationary syphon pipe 60 within the rotary joint, support means are associated with the fitting spider portion 46. Such support means include a bore 62 defined in the portion 46 concentric with the axis of sleeve 24. The bore 62 is of a tapered configuration converging toward the chamber 44. Within the bore 62 a plurality of arcuate, tapered wedge segments 64 are located, three being shown in the illustrated embodiment. The segments 64 are provided with a tapered outer surface of a configuration similar to that of the bore 62. The internal surface 66 of the segments 64 is cylindrical and of a diameter conforming to the outer diameter of the syphon pipe 60.

An annular wedge segment retainer 68 is attached to the fitting 36 by bolts 70 extending through holes defined in the retainer ears 72. The bolts 70 are threaded into threaded holes 74 defined in the fitting portion 46. The retainer 68 is of an annular configuration, having an inner diameter slightly greater than the outer diameter of the syphon pipe 60, whereby the larger ends of the segments 64 may be engaged by the retainer and, upon tightening of the bolts 70, the segments 64 will be forced into the conical bore 62 to firmly wedge the segments into engagement with the fitting bore 62 and the syphon pipe 60. Thus, the syphon pipe 60 will be firmly attached to the fitting 36 in a manner which will support the syphon pipe concentrically within the bore 62. The syphon pipe 60 may be released from the segments 64 by merely removing the bolts 70 and retainer 68 and removing the segments from the conical bore. As the segments 64 support the syphon pipe at a spaced location relative to the threads at the end of the pipe, the likelihood of fracturing of the syphon pipe at the threads is substantially eliminated and an improved support for the horizontal portion of the syphon pipe is produced.

Figure 2:
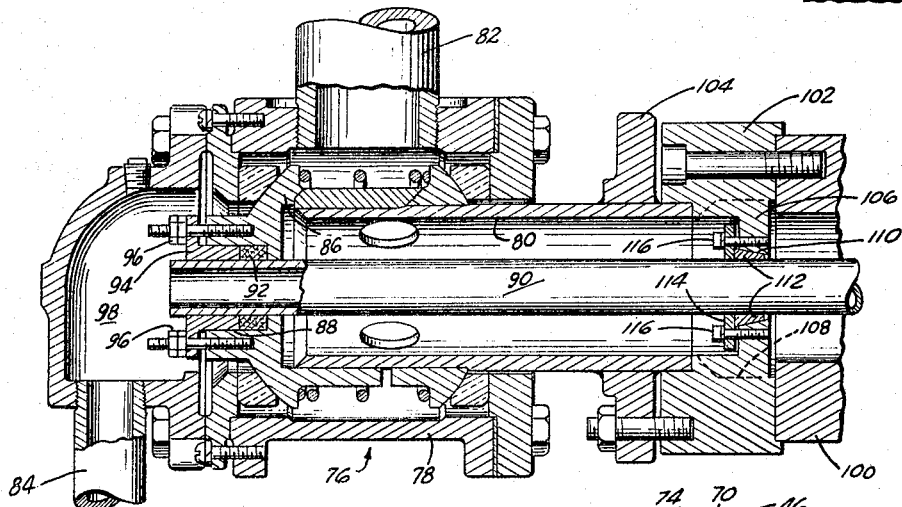
FIG. 2 is an elevational, diametrical, sectional view of a rotary joint structure and rotating syphon arrangement employing the invention as mounted on a drum journal.

The embodiment of FIG. 2 illustrates the inventive concepts as employed in conjunction with a rotary joint and a rotary syphon pipe assembly. In the illustrated embodiment of FIG. 2, the rotary joint 76 is of a type similar to that shown in the assignees' United States Patent No. 2,791,449 and will, therefore, not be described in detail. The joint 76 includes a housing 78 which is sealingly mounted on a sleeve 80. The heat exchange medium is introduced into the joint through the conduit 82 and the condensate is removed from the drum through the syphon pipe and the drainage system conduit 84. Sealing means are provided within the housing 78 to seal the housing with respect to the sleeve 80. The sealing means include the annular member 86 which is provided with a concentric bore 88 for receiving the end of the rotating syphon pipe horizontal portion 90. Annular packing 92 is located within the bore and a packing gland 94 compresses the packing upon the tightening of the nuts 96 to firmly attach the free end of the syphon pipe to the seal 86 so that the syphon pipe 90 will be in communication with the drainage system chamber 98.

The joint 76 is mounted on the drum hollow journal 100 by means of an adapter 102 and a release ring 104 which are similar in their construction to that shown in FIG. 1. The adapter 102 is provided with a spider portion 106 having openings 108 formed therein whereby the heat exchange medium may flow from the interior of the sleeve to the interior of the drum. The spider portion 106 also includes a conical bore 110 having a surface which converges toward the drum. Within the bore 110 a plurality of tapered wedge segments 112 are received which cooperate with a retainer 114 which may be adjusted by means of bolts 116 which threaded into threaded holes defined in the spider portion 106. The operation of the bolts 116, retainer 114, and tapered segments 112 is identical to that described with respect to the embodiment of FIG. 1. However, in this embodiment it will be appreciated that the segments 112 attach the syphon pipe to the adapter 102, rather than to the joint housing, as in FIG. 1. As the syphon pipe 90, in the embodiment of FIG. 2, is firmly supported at spaced locations, bending and breakage of the horizontal syphon pipe portion is effectively resisted.

It is appreciated that various modifications to the disclosed embodiments of the invention may be apparent to those skilled in the art without departing from the spirit and scope thereof, and it is intended that the invention be defined only by the scope of the following We claim:

1. In combination with a rotating drum having a hollow journal,
    (a) a rotary fluid conducting joint mounted upon the drum journal having an inlet and an outlet, said joint including a passage defined therein communicating with said joint inlet and the interior of the drum journal,
    (b) syphon pipe support means defined within said joint in said passage,
    (c) said syphon pipe support means including a spider defined within said passage, said spider including radially extending support portions having a relatively small cross-sectional dimension and defining fluid conducting openings therebetween,
    (d) a cylindrical syphon pipe extending through the drum hollow journal having an outlet end extending into said joint and communicating with said joint outlet,
    (e) a conical bore defined in said spider, the minimum diameter of said bore being greater than the diameter of said syphon pipe, said syphon pipe extending through said bore,
    (f) a plurality of individual wedge segments received in said conical bore, each of said segments having a retainer engaging end, an outer conical surface corresponding to the configuration of said bore surface and an inner cylindrical surface corresponding to the outer configuration of said syphon pipe,
    (g) an annular retainer ring having a centrally disposed bore receiving said syphon pipe and of a diameter greater than the diameter of said syphon pipe, said retainer having a plurality of radially extending ears defined thereon, a hole defined in each of said ears,
    (h) an axially extending threaded hole defined in each of said spider radially extending support portions, and
    (i) screw fasteners extending through said retainer ear holes and threaded into said spider support portions, threaded holes removably mounting said retainer upon the spider, said retainer engaging said segments' retainer engaging ends upon said segments being located within said conical spider bore and circumferentially spaced about said syphon pipe whereby said retainer maintains said segments in said conical bore so that said segments' conical surfaces directly engage said conical bore surface and said segments' cylindrical surfaces directly engage said syphon pipe to support said syphon pipe within said joint.

2. In the combination with a rotating drum as in claim 1 wherein:
    (a) said joint includes a stationary housing, said spider being mounted upon said stationary housing.

3. In the combination with a rotating drum as in claim 1 wherein:
    (a) said joint includes joint support means adapted to rotate with the drum, said spider being mounted upon said joint support means.

References Cited by the Examiner
UNITED STATES PATENTS

| | | | |
|---|---|---|---|
| 859,035 | 7/1907 | Atkins | 285—134 X |
| 1,331,994 | 2/1920 | Lundberg | 285—135 X |
| 1,520,705 | 12/1924 | Farmer | 285—64 |
| 1,804,810 | 5/1931 | Reedy | 285—135 |
| 1,899,469 | 2/1933 | Mecom | 285—116 X |
| 1,912,299 | 5/1933 | Parker. | |
| 2,402,224 | 6/1946 | Hornbostel | 285—134 |
| 2,819,099 | 1/1958 | Rittle | 285—323 X |

CARL W. TOMLIN, *Primary Examiner.*

EDWARD C. ALLEN, *Examiner.*

R. GIANGIORGI, *Assistant Examiner.*